US008224697B2

(12) United States Patent
Verma et al.

(10) Patent No.: US 8,224,697 B2
(45) Date of Patent: Jul. 17, 2012

(54) MANAGING CUSTOMER ENTITLEMENTS TO REWARDS FROM MULTIPLE ENTITLEMENT PROGRAMS

(75) Inventors: Sachin Verma, Walldorf (DE); Venkiteswaran Balakrishnan, Palakkad (IN)

(73) Assignee: SAP Aktiengesellschaft, Walldorf (DE)

( * ) Notice: Subject to any disclaimer, the term of this patent is extended or adjusted under 35 U.S.C. 154(b) by 1820 days.

(21) Appl. No.: 10/875,726

(22) Filed: Jun. 25, 2004

(65) Prior Publication Data

US 2005/0288998 A1    Dec. 29, 2005

(51) Int. Cl.
G06Q 30/00    (2006.01)
(52) U.S. Cl. .................. 705/14.3; 705/17; 705/39
(58) Field of Classification Search ............ 705/14
See application file for complete search history.

(56) References Cited

U.S. PATENT DOCUMENTS

| 5,233,514 | A | 8/1993 | Ayyoubi et al. |
| 6,039,244 | A | 3/2000 | Finsterwald |
| 6,057,872 | A | 5/2000 | Candelore |
| 6,415,261 | B1 | 7/2002 | Cybul et al. |
| 6,424,951 | B1 | 7/2002 | Shurling et al. |
| 6,582,370 | B2 | 6/2003 | Jibiki |
| 6,620,046 | B2 | 9/2003 | Rowe |
| 6,687,679 | B1 | 2/2004 | Van Luchene et al. |
| 6,985,879 | B2* | 1/2006 | Walker et al. .............. 705/35 |
| 7,054,830 | B1* | 5/2006 | Eggleston et al. .......... 705/14 |
| 7,194,448 | B2* | 3/2007 | Luth et al. ..................... 707/1 |
| 7,219,071 | B2* | 5/2007 | Gallagher ................... 705/14 |
| 7,320,428 | B2* | 1/2008 | Sisko et al. ................ 235/379 |
| 7,398,225 | B2* | 7/2008 | Voltmer et al. ............. 705/14 |
| 7,398,226 | B2* | 7/2008 | Haines et al. ............ 705/14.1 |
| 7,398,248 | B2* | 7/2008 | Phillips et al. ............. 705/39 |
| 7,401,151 | B2* | 7/2008 | Chatani .................... 709/229 |
| 2004/0122736 | A1* | 6/2004 | Strock et al. ............... 705/14 |
| 2004/0193489 | A1* | 9/2004 | Boyd et al. ................. 705/14 |

* cited by examiner

Primary Examiner — Raquel Alvarez
Assistant Examiner — Michael Goldman
(74) Attorney, Agent, or Firm — Fish & Richardson P.C.

(57) ABSTRACT

Managing entitlements to rewards from multiple entitlement programs includes receiving transaction data associated with a reward entity. The transaction data is generated by a computer application that is separate from an entitlement management component used to manage entitlements to rewards from multiple entitlement programs. One of the multiple entitlement programs that applies to the received transaction data is identified. Each entitlement program is associated with a type of reward and has an entitlement rule for determining, from transaction data, an amount of reward credit for the type of reward of the entitlement program. An entitlement rule of the identified entitlement program is used to determine an amount of reward credit to be provided to the reward entity associated with the received transaction data. The determined amount of reward credit is associated with the reward entity associated with the received transaction data.

17 Claims, 7 Drawing Sheets

MANAGING CUSTOMER ENTITLEMENTS TO REWARDS FROM MULTIPLE ENTITLEMENT PROGRAMS

TECHNICAL FIELD

This description relates to techniques for using a computer system to manage multiple types of entitlement programs for customers of a business enterprise.

BACKGROUND

Computer systems are often used by a business enterprise to track customer transactions with the business enterprise for the purpose of encouraging future transactions by customers with the business enterprise. One way to do so is to use a computer system to track and aggregate information about transactions made by a customer and, when the customer has met a certain threshold of transaction activity, provide an entitlement to a reward to the customer. One example of an entitlement to a reward is an entitlement to a ticket for free airline transportation of a certain type after a customer has flown a predetermined number of miles with an airline. Another example of an entitlement to a reward is an entitlement to a credit toward a future purchase after a customer spends a certain amount of money on purchases or makes a certain number of purchases within a period of time. Generally, an entitlement to a reward occurs after a customer has participated in multiple transactions with a business enterprise. A reward may be provided to a customer in the form of a certificate that may be later redeemed by the customer to obtain a service, a product or a credit. In addition, a computer system also may be used by a business enterprise to process a certificate or other type of indication of an entitlement to a reward that is redeemed by a customer to obtain a reward.

More particularly, computer systems are often used to track customer transactions and progress of a customer toward an entitlement to a reward, which generally involves a determination as to the amount of reward credit that should be accrued to a customer for each transaction by the customer. Also, computer systems are used to issue an entitlement to a reward to a customer after the customer accrues the amount of reward credit necessary to be entitled to a reward and are used to process the reward credit when the reward credit is redeemed by the customer to obtain a reward. In addition, computer systems are often used to monitor and update entitlement data associated with a customer. One example is eliminating reward credit for a transaction after a certain amount of time has passed since the transaction occurred. For example, a computer system may be used to identify and eliminate "expired miles" that were accrued by a customer. Accrued miles are determined to be "expired" based on the passing of a specified number of years since the airline flight was taken by the customer.

There are many different types of customer reward programs that provide customer entitlements to rewards. A customer reward program also may be referred to as an entitlement program.

SUMMARY

Generally, the invention provides the capability to determine when a customer is entitled to receive various types of rewards from a business enterprise. The determination is made based on transactions of the customer with the business enterprise and entitlement policies that govern the entitlement of a customer to a particular type of reward. In general, to do so, transaction data related to a customer transaction is processed based on entitlement policies for multiple entitlement programs, to accrue reward credit toward entitlements to receive a reward from each of the entitlement programs applicable to the transaction data. The reward credit associated with each customer is periodically processed, based on the entitlement policy for the entitlement program to which the reward credit relates, to determine whether a customer is entitled to receive a reward.

It is desirable in some cases to have entitlement management application software capable of handling entitlements for a variety of different entitlement programs. To do this, entitlement management application software may be designed that can handle different types of entitlements programs. The desirability of having entitlement management application software being capable of handling many different entitlement programs is important from the perspective of a business enterprise that sponsors different entitlement programs that give rise to the different types of customer rewards. This may be particularly true when a business enterprise is interested in encouraging customer loyalty over a long period of time in which many different entitlement programs may be used by the business enterprise.

One challenge in developing entitlement management application software able to manage a number of different types of entitlement rewards lies in maintaining entitlement data and entitlement rules describing how transactions are translated to reward credit toward a customer's entitlement to a reward. This is because different types of entitlement rewards use different accrual and redemption rules that require different types of data.

In one general aspect, managing entitlements to rewards from multiple entitlement programs includes receiving transaction data associated with a reward entity. The transaction data is generated by a computer application that is separate from an entitlement management component used to manage entitlements to rewards from multiple entitlement programs. One of the multiple entitlement programs that applies to the received transaction data is identified. Each entitlement program is associated with a type of reward and has an entitlement rule for determining, from transaction data, an amount of reward credit for the type of reward of the entitlement program. An entitlement rule of the identified entitlement program is used to determine an amount of reward credit to be provided to the reward entity associated with the received transaction data. The determined amount of reward credit is associated with the reward entity associated with the received transaction data.

Implementations may include one or more of the following features. For example, a second entitlement program of the multiple entitlement programs that applies to the received transaction data may be identified. An entitlement rule of the second entitlement program may be used to determine a second amount of reward credit to be provided to the reward recipient associated with the received transaction data. The second determined amount of reward credit may be associated with the reward recipient associated with the received transaction data.

The determined amount of reward credit may be associated with the first entitlement program, and the second determined amount of reward credit may be associated with the second entitlement program. Some of the transaction data may be sent from a first computing application and may apply to the first entitlement program, and another portion of the transaction data may be sent from a second computing application and may apply to the second entitlement program.

Whether a total amount of reward credit provided to the reward recipient entitles the reward recipient to a reward associated with the first entitlement program may be determined. When so, an indicator of an entitlement to the reward associated with the first entitlement program may be generated, and the indicator may be associated with the reward recipient. Whether a total amount of reward credit provided to the reward recipient entitles the reward recipient to a reward associated with the second entitlement program may be determined. When so, an indicator of an entitlement to the reward associated with the second entitlement program may be generated, and the indicator may be associated with the reward recipient. The indication of the entitlement to the reward may be transferred to a redemption computer application that is separate from the entitlement management component and that is capable of enabling the provision of the reward recipient with the reward.

Based on the entitlement rule of the first entitlement program, whether a portion of a total amount of reward credit for the first entitlement program associated with the reward recipient is expired may be determined. The total amount of reward credit associated with the reward recipient may be reduced by the expired portion from the total amount of reward credit associated with the reward recipient. The reduced amount of reward credit may be associated with the reward recipient as a new total amount of reward credit for the first entitlement program associated with the reward recipient.

Based on the entitlement rule of the second entitlement program, whether a portion of a total amount of reward credit for the second entitlement program associated with the reward recipient is expired may be determined. The total amount of reward credit associated with the reward recipient may be reduced by the expired portion from the total amount of reward credit associated with the reward recipient. The reduced amount of reward credit may be associated with the reward recipient as a new total amount of reward credit for the second entitlement program associated with the reward recipient.

The reward entity may be a person who has an account of reward credit and is eligible to receive rewards or a business entity that has an account of reward credit and is eligible to receive rewards.

Implementations of the techniques discussed above may include a method or process, a system or apparatus, or computer software on a computer-accessible medium.

The details of one or more of the implementations are set forth in the accompanying drawings and description below. Other features will be apparent from the description and drawings, and from the claims.

DETAILED DESCRIPTION

Figure 1A:
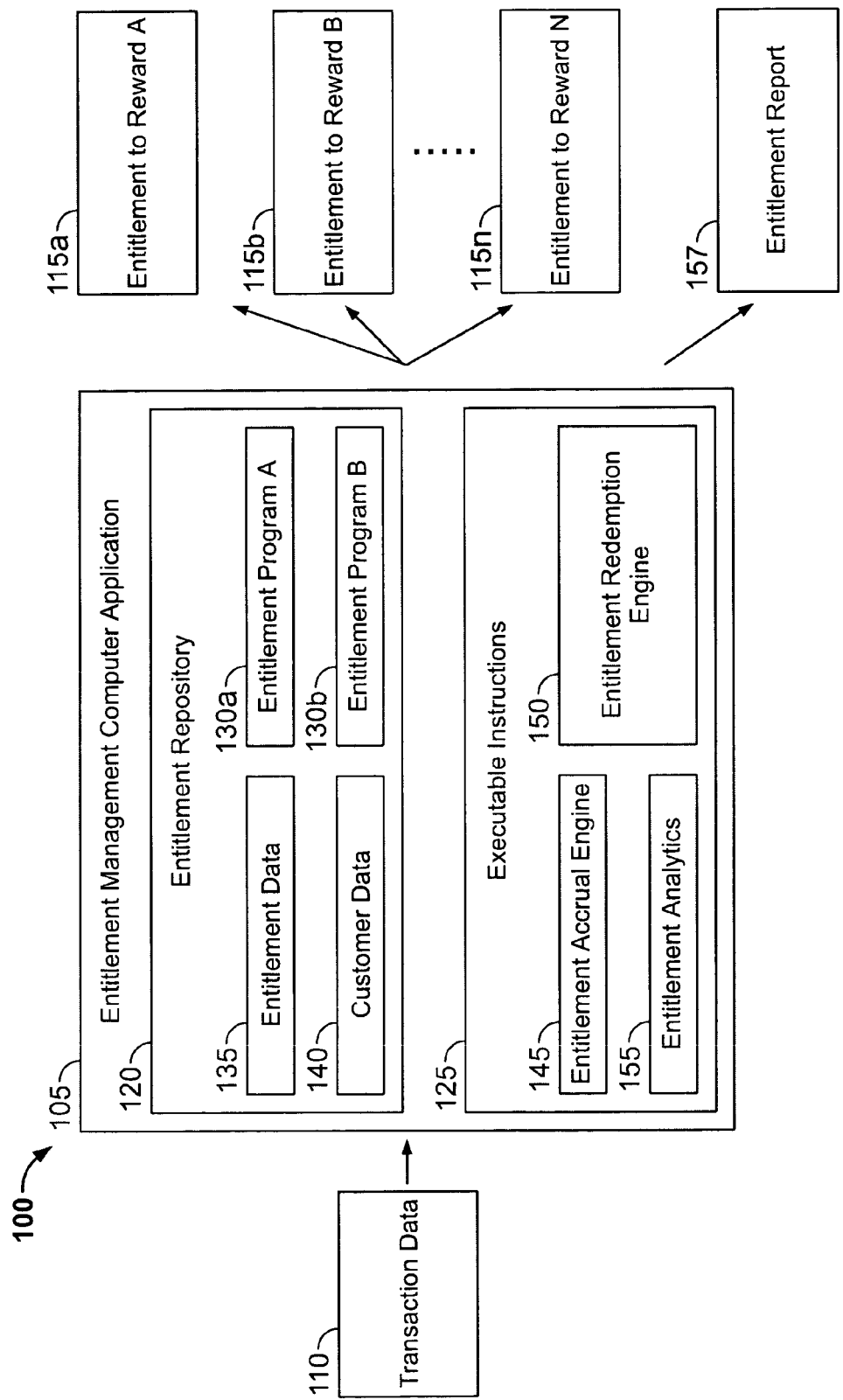
FIGS. 1A and 1B are block diagrams of a system for managing multiple types of entitlements.

FIG. 1A shows a computer system 100 on which an entitlement management computer application 105 executes to manage multiple entitlement programs for a business enterprise. To do so, the entitlement management computer application 105 determines when a customer of a business enterprise is entitled to receive various types of rewards from the business enterprise based on 1) transactions of the customer with the business enterprise and 2) entitlement policies of multiple entitlement programs that govern the entitlement of a customer to a particular type of reward. In general, the entitlement management computer application 105 receives transaction data 110 generated by a transaction application of a computer system, such as a sales order application or a financial management application. The entitlement management computer application 105 processes, based on rules that govern the entitlement programs, the transaction data to accrue reward credit of entitlement programs for customers and subsequently produces indications of entitlements to rewards 115a-115n for each customer that has accumulated sufficient reward credit to be entitled to a reward from one of the entitlement programs.

More particularly, the transaction data 110, received by the entitlement management computer application 105, includes information describing interactions between the business enterprise and the customers in which something of value is exchanged, which also may be called transactions. Examples of such interactions include sales of goods, purchases of services, establishment of an account with the business enterprise, making a first purchase from the business enterprise, and maintaining a relationship or an account with the business enterprise. The transaction data may include a value of a transaction and an indication of what the customer purchased from the business enterprise during the transaction. As another example, the transaction data 110 may include information describing an initial interaction with the business enterprise in which a relationship between a customer and the business enterprise is established. In addition, the transaction data 110 may include other information related to a transaction, such as a date and/or time that the transaction occurred or a location at which the transaction occurred.

The entitlements to rewards 115a-115n, produced by entitlement management computer application 105, are indications that customers of the business enterprise have accrued a sufficient amount of reward credit to be eligible to receive rewards. The entitlement management computer application 105 creates the indications of entitlements to rewards 115a-115n based on the reward credit that has accrued for the customers. For example, one of the entitlements to rewards 115a-115n may be an indication of an entitlement to a credit issued to a customer's account when the customer has spent a sufficient amount of money with the business enterprise. The credit may be a percentage or an amount that is discounted from a subsequent transaction with the business enterprise. Another example of one of the entitlements to rewards 115a-115n is an entitlement to a free plane ticket or additional frequent flyer miles when a sufficient number of frequent flyer miles have accrued. The entitlements to rewards 115a-115n may be physically or electronically presented to the corresponding customers. When physically presented to the corresponding customers, the entitlements to rewards 115a-115n may be objects that may be exchanged for the rewards. For example, the credit may be represented by a physical certificate or coupon that is presented to the customer, and the customer may be required to present the certificate to the business enterprise to receive the represented credit. When electronically presented to the corresponding customers, the entitlements to rewards 115a-115n may cause the rewards to be redeemed automatically on a subsequent transaction with the business enterprise. For example, the credit may be automatically associated with a corresponding customer's account and applied to a subsequent purchase made by the customer.

An indication of an entitlement to a reward need not necessarily be produced each time a sufficient amount of reward credit to receive a reward is accrued. This may be particularly useful when an entitlement program offers different rewards for various thresholds of accrued reward credit. For example, a customer who is a member of an airline's frequent flyer program may accrue hundreds of thousands of miles before an indication of an entitlement (e.g., a certificate for an airline flight of particular characteristics) to a reward is produced, even when the customer may be entitled to a reward once twenty-five thousand miles have been accrued.

In addition, a reward may be redeemed even though an indication of entitlement to the reward has not been generated. In such a case, a customer monitors personal reward credit that has accrued and determines when a sufficient amount of reward credit to receive a reward has accrued. When the sufficient amount has accrued, the customer may attempt to redeem the reward, even though no indication of entitlement to the reward has been generated. When the customer attempts to redeem the reward, an indication of entitlement to the reward may be generated.

The entitlement management computer application 105 includes an entitlement repository 120 for storing policy data about multiple entitlement programs 130a-130b, entitlement data 135, and customer data 140. In one implementation, the entitlement repository 120 is a relational database keyed on identifiers of customers for which entitlements are managed. In another implementation, the entitlement repository 120 is an object-oriented database. In yet another implementation, the entitlement repository 120 is a collection of Extensible Markup Language (XML) files.

The entitlement programs 130a-130b offered by the business enterprise provide a customer with rewards when the customer has participated in an amount of interaction with business enterprise that exceeds a threshold amount. Interactions of a customer with the business enterprise may include transactions between the customer and the business enterprise in which something of value, such as money, goods, services, or personal information, is exchanged. The interactions with the business enterprise are described in the transaction data 110, previously described. The entitlement programs 130a-130b also may be known as reward programs, customer reward programs, supplier reward programs, frequent buyer programs, frequent flier programs, or employee reward programs.

The threshold amount of interaction necessary to obtain a reward of a particular entitlement program may be defined as an amount of money spent with the business enterprise, an amount of products purchased from the business enterprise, a frequency of interaction with the business enterprise, a number of interactions with the business enterprise, or a length of relationship with the business enterprise. For example, a reward may be presented to a customer after the customer has spent $500 with the business enterprise, has purchased 100 products from the business enterprise, has purchased something from the business enterprise once every week, has purchased something from the business enterprise 100 times, or has been participating in transactions with the business enterprise for five years.

The entitlement programs 130a-130b include rules that specify the threshold amount of interaction and the rewards that may be redeemed once the customer has participated in the sufficient amount of interaction. In addition, the rules specify how credit towards the rewards is accrued for customers. For example, the entitlement programs 130a-130b may specify that an amount of reward credit equal to the value of a transaction may be accrued. In another example, the entitlement programs 130a-130b may specify that an amount of reward credit equal to a percentage of the value of a transaction may be accrued. Similarly, the entitlement programs 130a-130b may specify that an amount of reward credit equal to a percentage of the value of a transaction above a threshold may be accrued. The entitlement programs 130a-130b may specify that an amount of reward credit equal to a percentage of the quantity of goods or services purchased in a transaction may be accrued. Reward credit may be accrued according to a points model, in which reward credit takes the form of points that are accrued for certain values of transactions or amounts of goods and services purchased. Frequent flyer miles are an example of reward credit that is accrued according to a points model. Reward credit may be accrued when a relationship with the business enterprise is established. For example, the entitlement programs 130a-130b may specify that an amount of reward credit is accrued when a customer establishes a relationship with the business enterprise or participates in a first transaction with the business enterprise.

In addition, the entitlement programs 130a-130b also may include information about one or more redemption mechanisms that specify how reward credit may be redeemed for rewards. For example, accrued reward credit may entitle customers to on invoice discounts, off invoice discounts, free products or services, return privileges, upgraded service levels, coupons, more lenient attrition rules, or some other object or service of value.

The entitlement programs 130a-130b also may include monitoring rules that determine how the entitlement management computer application 105 is maintained. For example, the monitoring rules may include rules specifying when accrued reward credit or entitlements to rewards received from accrued reward credit expire. In another example, a monitoring rule may monitor information in customer data and provide a reward credit to a customer based on a customer attribute, such as length of a customer's relationship with the business enterprise. For example, a customer may receive a reward credit after being a customer for five years.

The entitlement data 135 stored within the entitlement repository 120 indicates the reward credit that has accrued for customers that participate in one or both of the entitlement programs 130a and 130b. As reward credit is accrued, information describing the reward credit is stored within the entitlement data 135. The reward credit stored within the entitlement data 135 is used to determine when rewards should be given to the customers. In one implementation, the entitlement data 135 also includes indications of entitlements to rewards for the customers. For example, particularly when the indications of the entitlements are not transferred from the entitlement management computer application 105 to a computer application used to provide or process the indication of entitlement to a reward for an entitlement program, the indications may be stored in the entitlement data 135.

The customer data 140 is also stored within the entitlement repository 120. The customer data 140 includes data for customers of the business enterprise with which the business enterprise may participate in transactions. For example, the data for a customer may include an identifier of the customer, the customer's name and address, and an address to which entitlements to rewards for which the customer has qualified may be sent. As one skilled in the art would recognize, the customer data 140 need not necessarily be included in the entitlement management computer application 105.

In addition to data stored in the entitlement repository 120, the entitlement management computer application 105 includes executable instructions 125 for managing entitlement information.

The executable instructions 125 include an entitlement accrual engine 145 to determine the amount and type of reward credit to be accrued to a customer as a result of the transaction data 110. The type of reward credit may be an indicator of a particular entitlement program. For example, reward credit in the type of "miles" may be used by a frequent flyer program, whereas reward credit in the type of "dollars" may be used in a product purchase program in which product purchases of particular amounts are rewarded.

To process the transaction data, the entitlement accrual engine 145 accesses the policy data about each of the entitlement programs 130a-130b, which include rules that indicate the manner in which the transaction data 110 is to be processed to determine reward credit for customers. Based on the rules from the policy data of each of the entitlement programs 130a-130b, the entitlement accrual engine 145 calculates reward credit accrued from the transaction data 110 for each customer and stores the calculated reward credit in the entitlement data 135.

The executable instructions 125 include an entitlement redemption engine 150 for determining whether customers are eligible for rewards based on the reward credit stored in the entitlement data 135 and the policy data of the entitlement programs 130a-130b to which the reward credit relates. To do so, the entitlement redemption engine 150 accesses the policy data of the entitlement programs 130a-130b, which include rules that relate accrued reward credit to entitlements to rewards that may be redeemed. In other words, the rules indicate the amounts of reward credit that are needed to become eligible to receive a reward from the entitlement programs from which the reward is provided. The entitlement redemption engine 150 uses the rules from the entitlement programs 130a-130b to determine if a customer is entitled to a reward based on the reward credit associated with the customer in the entitlement data 135. If a customer qualifies for a reward from one or more entitlement program, indications of entitlement to a reward is generated. The indications of entitlement to a reward may be stored in the entitlement repository 120. Alternatively or additionally, the indications of an entitlement to a reward may be transferred from the entitlement management computer application 105 to another computer application that is used to process the indications from which the rewards is redeemed by the customer. The computer application to which the entitlement indication is provided may be the same computer application that generated the transaction data 110 from which a portion or all of the reward credit for the entitlement was generated, though this need not necessarily be so.

The executable instructions 125 includes instructions for entitlement analytics 155 for performing analytical processes across the multiple entitlement programs on the information stored in the entitlement repository 120. For example, an analytical process may be performed to determine the total cost of the rewards offered by the business enterprise, because the entitlement programs are managed centrally by the entitlement management computer application 105. As another example, the entitlement management computer application 105 may be used to identify the customers that are or are not accruing reward credit or receiving rewards. As yet another example, an analytical process may be used to determine the collective cost of the multiple entitlement programs to the business enterprise. The results of the analytical processes performed by the entitlement management computer application 105 may be output as one or more entitlement report 157. In one implementation, the entitlement report 157 includes text and/or graphics that describe the operation and state of the entitlement information in the entitlement repository 120. For example, the entitlement report 157 may include information describing customer reward credit balances identified through the execution of the entitlement analytics 155 instructions. In another example, the entitlement report 157 may generate a bar chart that presents the amount of redeemed rewards and amount of reward credit for each of the entitlement programs 130a and 130b as of a particular date.

In some implementations, the entitlement management computer application 105 may be able to track information over multiple phases of a customer engagement lifecycle from a marketing phase designed to entice a new customer, such as by the use of modeling appropriate entitlement programs, a sales phase in which reward credit is created and redeemed, and a service phase in which reward credit are created and redeemed.

The ability of the entitlement management computer application 105 to track different types of entitlements may help to reduce the number of different computer systems and applications used to track different types of entitlement programs, which, in turn, may help to reduce system complexity and total cost of ownership of computer systems and applications used for entitlement management in the business enterprise. Also, the use of the entitlement management computer application 105 may help to manage long-term customer relationships by storing a description of rewards provided to a customer by different entitlement programs over the course of the customer's relationship with the business enterprise. This may be particularly true when entitlement data about rewards provided to a customer, over a long period of time, by multiple different entitlement programs are available. Also, the entitlement management computer application 105 may help improve the ability of the business enterprise to manage the cost of entitlement programs across the business enterprise. This may be because information about reward credit and entitlements to rewards for multiple entitlement programs are included in one computer application 105 that is able to store entitlement information about multiple entitlement programs and generate analytical reports across the multiple entitlement programs.

In some implementations, the entitlement management computer application 105 may be accessed by customers for which reward credit and entitlements are managed with the entitlement management computer application 105 such that the customer may monitor the accrued reward credit and entitlements. In such implementations, the computer system 100 on which the entitlement management computer application 105 operates may be connected to one or more local area networks (LANs) and/or one or more wide area networks (WANs).

Figure 1B:
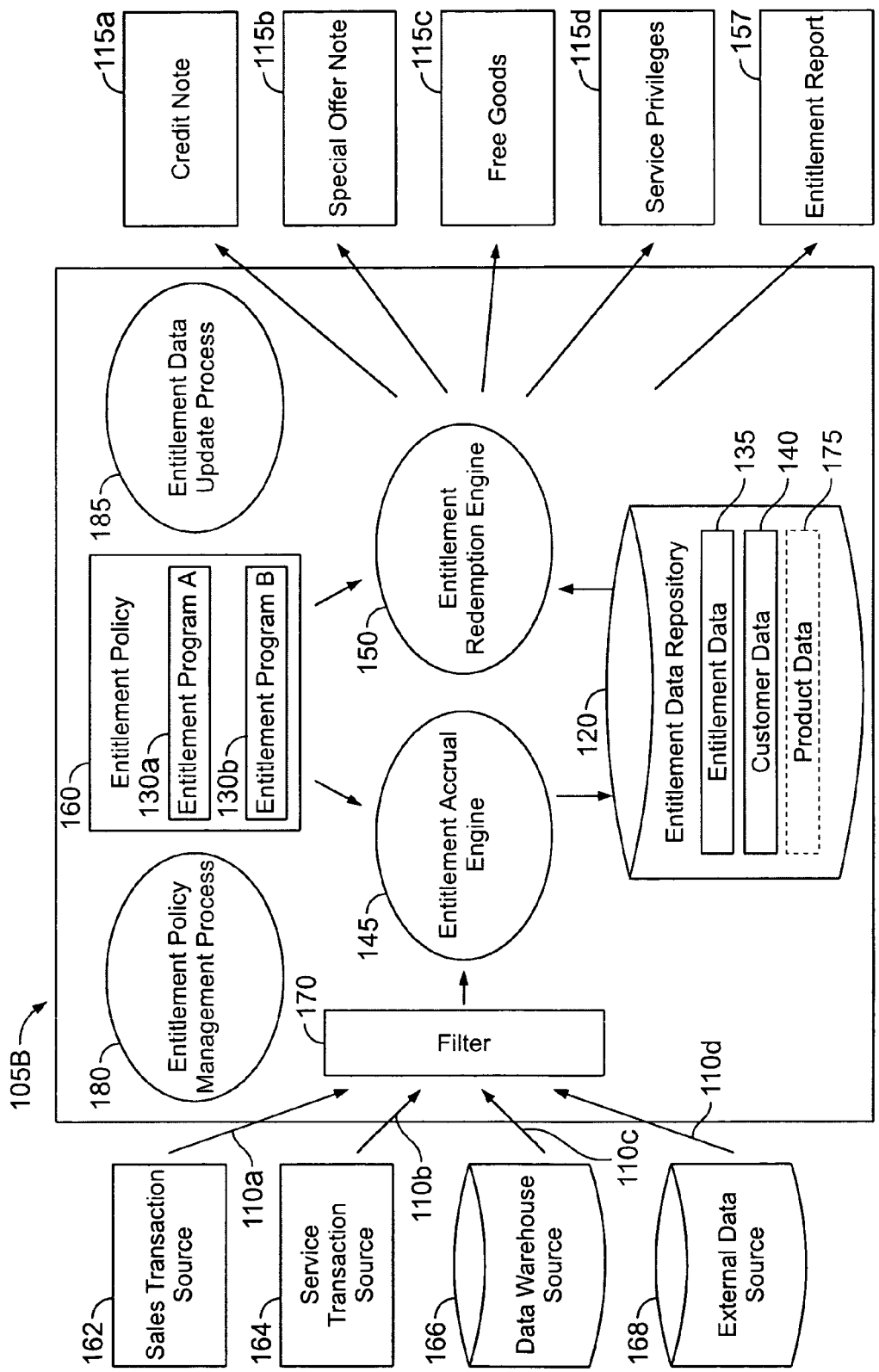

FIG. 1B illustrates an implementation 105B of the entitlement management computer application 105 in FIG. 1A. For brevity, the structure and arrangement of FIG. 1B is based on the structure and arrangement of FIG. 1A. As would be recognized by one skilled in the art, however, the components and processes of FIG. 1B need not be the same as those described with respect to FIG. 1A, nor are the techniques described with respect to FIG. 1B limited to being performed by the structure and arrangement illustrated by FIG. 1B.

In the implementation of the entitlement management computer application 105B illustrated in FIG. 1B, the information about the entitlement programs 130a-130b is no longer stored in the entitlement repository 120 and is stored in an entitlement policy 160 data store. The entitlement policy 160 data store includes information describing the entitlement programs managed by the entitlement management computer application 105B.

One or more data sources 162-168 provide the transaction data, represented by the arrows 110a-110d, that is processed by the entitlement management computer application 105B to produce one or more indications 115a-115d of entitlements to rewards. The entitlement management computer application 105B includes a filter process 170 that extracts information relevant to the entitlement management computer application 105B from the transaction data received from the data sources 162-168. The entitlement repository 120 also includes product data 175 in addition to entitlement data 140 and customer data 150. The entitlement management computer application 105 also includes an entitlement policy management process 180 and an entitlement data update process 185.

The data sources 162-168 may include a sales transaction source 162, a service transaction source 164, a data warehouse data source 166, and an external data source 168. The entitlement management computer application 105B receives transaction data from the sales transaction source 162 that describes transactions in which a customer purchases a tangible product from the business enterprise. Similarly, the entitlement management computer application 105B receives transaction data from the service transaction source 164 that describes transactions in which a customer purchases a service from the business enterprise. Both the sales transaction source 162 and the service transaction source 164 may provide transaction data to the entitlement management computer application 105B as the corresponding transactions occur. Additionally or alternatively, the sales transaction source 162 and the service transaction source 164 may provide transaction data describing multiple transactions to the entitlement management computer application 105B after the multiple transactions have occurred. In some implementations, a data source may provide both service transactions and sales transactions.

The entitlement management computer application 105B receives information describing customers of the business enterprise from the data warehouse data source 166. The customer information may include information describing previous or current transactions, as well as other information describing the customers (such as a customer rating indicating how valuable the customer is to the business enterprise or the date of the customer's first transaction with the business enterprise. The transaction information provided to the entitlement management computer application 105B from the data warehouse data source 166 may not be generated by the data warehouse data source 166. For example, other transactional systems may generate the transaction information and may transfer the transaction information to the data warehouse data source 166 for storage. The data warehouse data source 166 may then access and transfer the stored transaction information to the entitlement management computer application 105B.

The entitlement management computer application 105B also may receive other transaction information from entities external to the business enterprise that may be relevant to the operation of the entitlement management computer application 105B from the external data source 168. For example, the external data source 168 may provide information describing transactions between customers of the business enterprise and business partners or suppliers of the business enterprise for which entitlements are rewarded in one or more of the entitlement programs 130a-130b to the entitlement management computer application 105B. For example, the entitlement management computer application 105B may be managed by an airline that offers frequent flier miles as reward credit. The airline may have a hotel and a car rental company as business partners, and frequent flier miles may be given to customers for transactions with the hotel or the car rental company. The external data source 168 may provide data describing those transactions such that frequent flier miles may be accrued from those transactions.

As would be recognized by one skilled in the art, each of the data sources 162-168 provide data based on transactions of a customer with the business enterprise, though the data provided by each of the data sources 162-168 need not necessarily be transaction data. For example, the data warehouse data source 166 may provide, to the entitlement management computer application 105B, data that aggregates or otherwise summarizes sales or service transactions by a customer. In another example, the data warehouse data source 166 may provide sales or service transaction data that has been combined with other types of customer data, such as a customer value indication or an indication of the length of a customer's relationship with the business enterprise, which also may be referred to as customer longevity.

The entitlement management computer application 105B uses a filter process 170 to identify, from the information received from the data sources 162-168, the information that is necessary to determine what reward credit is accrued. For example, the filter process 170 may filter out information describing a transaction if no reward credit may be accrued form the transaction, based on the entitlement programs 130a-130b. As another example, the filter process 170 may filter out parts of information describing a transaction that are not directly related to reward credit that may be accrued from the transaction, such as a time or location of the transaction, because such information may not be needed to determine what reward credit are accrued as a result of the transaction. Only the filtered information is provided to the entitlement accrual engine 145.

The indications 115a-115d of entitlements to rewards are indications that customers of the business enterprise have qualified for rewards. The indications 115a-115d enable the customers to be provided with rewards specified in the indications 115a-115d. After generation, the entitlements to rewards 115a-115d may be transferred to external systems or transaction systems such that the corresponding rewards may be redeemed by the customers that are entitled to the rewards from the transaction systems. Alternatively, the indications 115a-115d may be transferred to the customers entitled to the rewards such that the customers may personally present the indications to the transaction systems to be provided with the rewards. Alternatively or additionally, the indications 115a-115d may be stored on the entitlement management computer system 105B, for example, in the entitlement data 135.

In addition, a sales system or a transactional system may query the entitlement management computer application 105B to determine whether the indications 115a-115d have been generated. For example, when a customer wants to redeem an entitlement to a reward from the sales system, the sales system may query the entitlement management computer application 105B to determine if an indication of the entitlement to the reward has been generated. The entitlement management computer application 105B may access an indication of the entitlement that has been generated, or the entitlement management computer application 105B may generate an indication of the entitlement if the customer qualifies for the reward. The entitlement management computer application 105B may transfer the indication of the entitlement to the reward to the sales system. Upon receipt of the indication, the sales system may provide the reward to the customer because the customer's entitlement to the reward has been verified.

The indications 115a-115d include a credit note indication 115a, a special offer indication 115b, free goods indication 115c, and a service privilege indication 115d. The credit note indication 115a entitles a customer to a credit with the business enterprise after the customer has accrued a sufficient amount of entitlements. For example, the credit note indication 115a may entitle the customer to a $20 discount off of the customer's next purchase from the business enterprise. Similarly, the special offer indication 115b entitles a customer to a special offer that may be applied to a subsequent transaction with the business enterprise. For example, the special offer indication 115b may entitle the customer to a 20% discount on a subsequent transaction with the business enterprise. The free goods indication 115c may entitle a customer to free goods from the business enterprise. The service privilege indication 115d may entitle a customer to a new service or an upgrade in service from the business enterprise. For example, the service privilege indication 115d may entitle the recipient to a level of service above what is normally used by the recipient.

Each of the data sources 162-168 and each of the redemption systems 115a-115d may be implemented on the same computer system as the entitlement management computer application 105B. Alternatively, some or all of the data sources 162-168 and the redemption sources 115a-115d may be operated on one or more different computer systems than the computer system on which the entitlement management computer application 105B is operated. In such a case, the data sources 162-168 and the redemption sources 162-168 may communicate with the entitlement management computer application 105B using one or more LANs and/or one or more WANs using wired or wireless communication pathways.

The entitlement repository 120 also includes optional product data 175. The product data 175 includes information describing products sold by the business enterprise or products that may be redeemed in exchange for accrued reward credit. The product data 175 may be used while processing transaction data from the data sources 162-168. For example, the product data 175 provides information needed to determine an amount of reward credit that accrued from a particular amount of goods or services that have been purchased from the business enterprise. For example, the product data 175 may aid in the determination of a length of a flight corresponding to a purchased airline ticket when the amount of reward credit that is accrued from the purchase of the airline ticket depends on the length of the flight.

The rules included in the entitlement programs 130a-130b may be user configurable, which enables the entitlement management computer application 105B to be configured more easily for operation in a business enterprise that is geographically dispersed, a business enterprise having many different entitlement programs, and a business enterprise in which entitlement rules change frequently. More particularly, an entitlement policy management process 180 may enable a user to configure rules of entitlement policies of the entitlement programs 130a-130b. For example, the entitlement policy management process 180 may enable a user to add, delete, or modify rules of the entitlement policies. In addition, the entitlement policy management process 180 may enable the user to delete one of the entitlement programs 130a or 130b from the entitlement policy 160 or to add a new entitlement program to the entitlement policy 160.

The entitlement management computer application 105B also includes a process 185 for updating the entitlement data 135. The entitlement data update process 185 may be used to update the entitlement data 135 when rewards are redeemed. More particularly, an amount of reward credit is spent when a reward is redeemed. The amount of reward credit corresponds to the amount of reward credit required to generate an indication of an entitlement to the reward. The entitlement data process 185 disassociates the spent reward credit from an account of a customer for which the reward was redeemed. In addition, the entitlement data update process 185 may delete expired reward credit or indications of entitlements to rewards. For example, reward credit may have an expiration date after which the reward credit may not be used to generate the indications 115a-115d of entitlements to rewards. After the expiration date, the update process 185 may remove the reward credit from an account with which the reward credit is associated. Similarly, entitlements to rewards may have an expiration date after which the corresponding rewards may not be redeemed. The update process 185 may remove indications of the expired entitlements from accounts with which the entitlements are associated.

Figure 2:
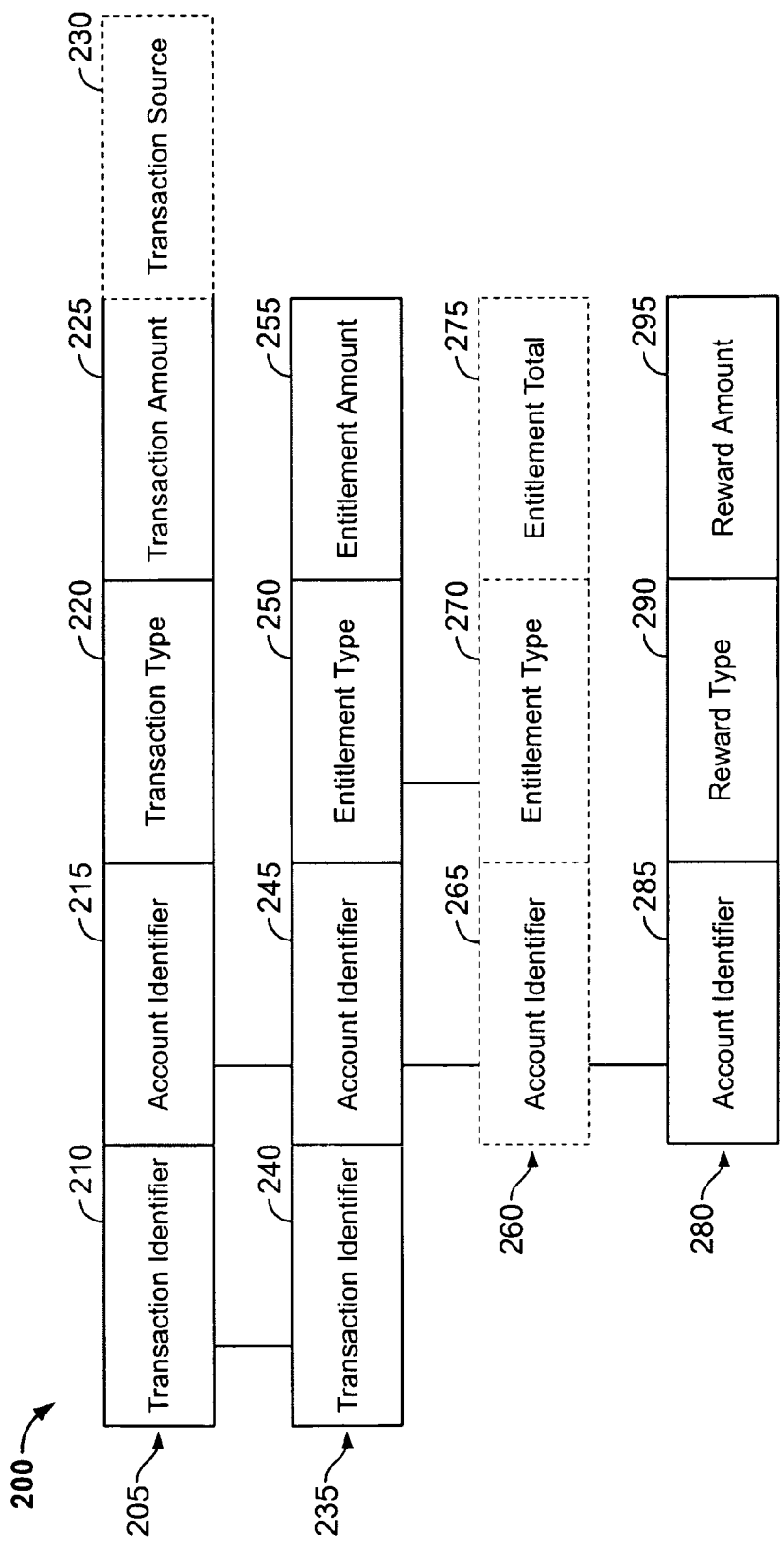
FIG. 2 is a block diagram illustrating example data structures for use in managing entitlement data for multiple entitlement programs.

FIG. 2 shows an example of a data structure 200 that can be used for managing entitlement data for multiple entitlement programs. The data structure 200 includes transaction information 205 that may be, for example, an implementation of the transaction data 110 of FIG. 1A. The transaction information 205 specifies one transaction from which reward credit may be accrued. The transaction information 205 includes a transaction identifier 210 that uniquely identifies information associated with a particular transaction, an account identifier 215, a transaction type 220, a transaction amount 225, and, optionally, a transaction source 230. The account identifier 210 identifies an account to which reward credit accrued from the corresponding transaction is to be applied. The account may be associated with a customer involved in the corresponding transaction. For example, the account identifier 210 may be a name or some other unique identifier of the customer involved in the corresponding transaction or of the account itself. When the account identifier 210 is an identifier of the customer involved in the corresponding transaction, the account identifier 210 may not uniquely identify a single account held by the customer, because the customer may hold multiple accounts that are identifiable by the identifier of the customer.

The transaction type 220 specifies a type for the corresponding transaction. The type of the corresponding transaction may affect the reward credit for an entitlement program that is accrued. In other words, particular types of transactions may result in the accrual of particular types of reward credit for one or more particular entitlement programs. Similarly, the transaction amount 225 may affect the amount of reward credit that is accrued as a result of the corresponding transaction. For example, the transaction amount 225 may identify a value of the corresponding transaction or an amount of goods or services purchased in the corresponding transaction. Typically, the combination of the transaction type 220 and the transaction amount 225 uniquely determine the reward credit that are accrued as a result of the transaction corresponding to the transaction information 205.

In some implementations, the transaction source 230 may aid in determining which of the multiple entitlement programs a transaction should be applied. In one example, a transaction source may represent a computer application that may be used to distinguish the entitlement program to which a transaction applies. In such a case, for example, a transaction from a computer application used for issuing airline tickets may be associated with a frequent flyer entitlement program, whereas a transaction from a retail point-of-sale application may indicate be associated with a frequent buyer entitlement program.

In another example, different entities with which a transaction may occur may offer different reward credit for the same type of transaction. In such a case, the transaction source 230 distinguishes between the different entities such that the appropriate reward credit may be identified and accrued. As example, two different airlines may each offer different entitlement programs that are managed by the entitlement management computer application, and a customer may purchase a $200 plane ticket from both the first and the second airline. In an entitlement program offered by the first airline, one frequent flyer mile may be awarded for every dollar spent with the first airline. In an entitlement program offered by the second airline, one frequent flyer mile may be awarded for every mile flown with the second airline. The transaction types 220 and the transaction amounts 225 of each transaction indicate that $200 plane tickets were purchased. The transaction source 230 of the first transaction indicates that the first transaction was with the first airline and therefore should be associated with the first airline's entitlement program, whereas transaction source 230 of the second transaction indicates that the second transaction was with the second airline and therefore should be associated with the second airline's entitlement program.

The data structure 200 also includes entitlement information 235 that may be, for example, an implementation of the entitlement data 140 of FIG. 1A or the entitlement data 140 of FIG. 1B. The entitlement information 235 represents a reward credit that is accrued as a result of a transaction represented by an instance of the transaction information 205. The entitlement information 235 includes a transaction identifier 240 from the transaction identifier 210 of the transaction information 205 that corresponds to the entitlement information 235. As such, the transaction identifier 240 uniquely identifies information associated with a particular transaction, and, consequently, with a particular reward credit for a particular entitlement program. In some implementations, the transaction identifier 240 may match the transaction identifier 210.

The entitlement information 235 also includes an account identifier 245 that corresponds to the account identifier 215 of the transaction information 205 that corresponds to the entitlement information 235. Therefore, the account identifier 245 uniquely identifies information associated with a particular transaction, and, consequently, with a particular reward credit for a particular entitlement program. In some implementations, the account identifier 245 matches the account identifier 215.

The entitlement information 250 also includes an entitlement type 250 that identifies a type for the corresponding reward credit. More particularly, the entitlement type 250 identifies the type of reward credit for a particular entitlement program that is accrued as a result of the transaction identified by the transaction identifiers 240 and 210. The entitlement information 235 also includes an entitlement amount 255 that identifies an amount of the reward credit that is accrued. As such, a customer's reward credit balance is accrued.

The data structure 200 also includes optional consolidated entitlement information 260. The consolidated entitlement information 260 includes an account identifier 265, an entitlement type 270, and an entitlement total 275. The consolidated entitlement information 260 combines information specified in instances of the entitlement information 235 with account identifiers 245 and entitlement types 250 that match the account identifier 265 and the entitlement type 270. The entitlement total 270 represents the sum of the entitlement amounts 255 of the matching instances of the entitlement information 235. When an instance of the entitlement information 235 is stored, the entitlement total 275 of an instance of the consolidated entitlement information 260 with an account identifier 265 and an entitlement type 270 that match the account identifier 245 and the entitlement type 250 of the recently stored entitlement information 235 is updated to include the entitlement amount 255. Using instances of the consolidated entitlement information 260 to total different types of reward credit for different accounts as the reward credit are accrued eliminates the need to total the reward credit later.

The data structure 200 also includes redemption information 280 that represents an indication of an entitlement to a reward that is provided when a sufficient amount of reward credit have accrued for a particular account. The redemption information 280 includes an account identifier 285 that identifies the particular account to which the award is provided. The redemption information 280 also includes a reward type 290 and a reward amount 295 that collectively specify the reward to which the account is entitled. The account identifier 285 matches an account identifier 245 from one or more instances of the entitlement information 235 or an account identifier 260 from one or more instances of the consolidated entitlement information 260.

Figure 3:
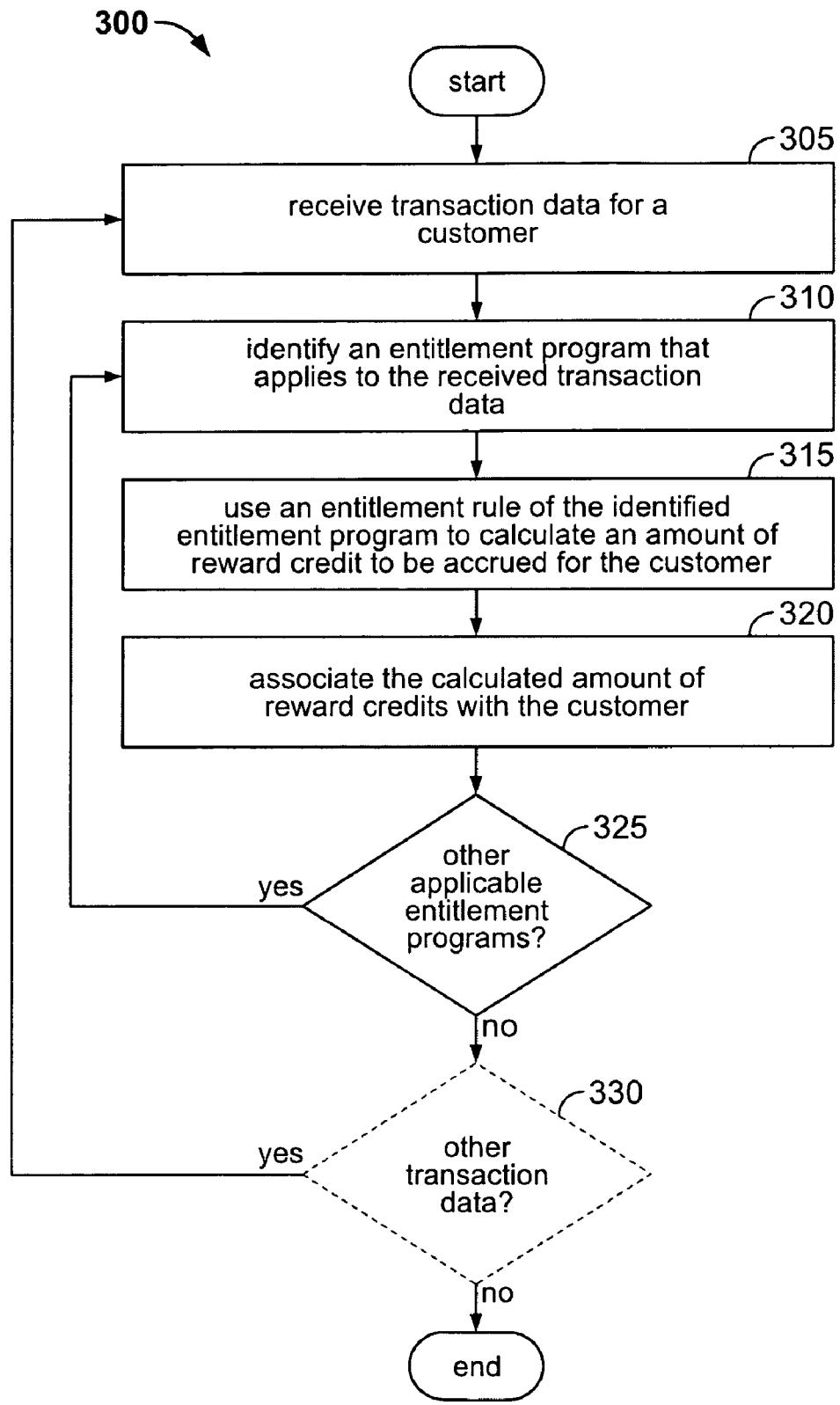
FIG. 3 is a flow chart of a process for accruing reward credit used in multiple types of entitlements.

FIG. 3 is a flow chart of a process 300 for receiving and accruing entitlement information. The process 300 is used to process received transaction data to accrue reward credit for users or accounts associated with the transaction information. The process 300 may be executed on a periodic or aperiodic basis, and the process 300 may be executed each time transaction information is received, or after multiple pieces of transaction information have been received. The process 300 is executed by an entitlement management computer application, such as the entitlement management computer application 105 of FIGS. 1A and 105B of FIG. 1B. More particularly, the process 300 is executed by an entitlement accrual engine, such as the entitlement accrual engine 145 of FIGS. 1A and 1B, in conjunction with an entitlement repository, such as the entitlement repository 120 of FIGS. 1A and 1B, and the entitlement policy 160 of FIG. 1B.

The process 300 begins when the entitlement accrual engine receives transaction data for a customer (step 305). The transaction data specifies one or more transactions between the customer and a business enterprise that manages the entitlement management computer application from which reward credit may be accrued. The transaction data may be received from multiple data sources, such as the data sources 162-168 of FIG. 1B. In one implementation, the entitlement accrual engine receives the transaction data directly from one of the data sources. In another implementation, the transaction data is first sent to a filter, such as the filter 170 of FIG. 1B, which identifies and sends to the entitlement accrual engine only the transaction data that is relevant to the entitlements managed by the entitlement management computer application.

The entitlement accrual engine identifies an entitlement program managed by the entitlement management computer application that applies to the received transaction data (step 310). The rules related to the identified entitlement program indicate how to process the received transaction data and what to store in the entitlement repository. The received transaction data may only relate to a subset of the entitlement programs managed by the entitlement management computer application. Therefore, only the appropriate entitlement programs that relate to the reward credit relevant to the received transaction data are identified.

In order to identify applicable entitlement programs, the entitlement accrual engine may access a table identifying data sources and record types that indicates one or more applicable entitlement programs. Alternatively or additionally, the received transaction data may include an indication of the entitlement programs applicable to the transaction data. In another implementation, when the process 300 is initiated, only the applicable entitlement programs may be made available to the entitlement accrual engine, so the entitlement accrual engine simply accesses the entitlement programs that are available.

The entitlement accrual engine uses an entitlement rule from the identified entitlement program to calculate an amount of reward credit to be accrued for the customer (step 315). The entitlement rules of the identified entitlement program indicate the type, amount and process by which reward credit may be accrued from the received transaction data. For example, the entitlement accrual engine may identify that 500 frequent flyer miles are accrued from a $500 transaction with an airline because an entitlement rule from the identified entitlement program indicates that one frequent flyer mile is accrued for each dollar spent with the airline. As another example, the entitlement accrual engine may identify that a $1 reward credit is accrued from a $125 transaction because an entitlement rule from the identified entitlement program indicates that a $1 reward credit is accrued for every $100 spent. Alternatively or additionally, the calculated amount of reward credit to be accrued may not directly depend on the value of a transaction. For example, the entitlement accrual engine may identify that 500 frequent flyer miles are accrued for a customer because an entitlement rule from the identified entitlement program indicates that 500 frequent flyer miles are accrued when a customer opens a new account or participates in a first transaction. As another example, the entitlement accrual engine may determine that a $50 reward credit is accrued for a customer that has been a customer of the business enterprise for 50 years because an entitlement rule from the identified entitlement program indicates that a $1 reward credit is accrued for each year of customer longevity.

The entitlement accrual engine may need to process the transaction data before determining an amount of reward credit that is accrued from the transaction data. For example, the identified entitlement program may indicate that a frequent flyer mile is accrued for each mile flown with an airline, but the transaction data may only indicate an origin and a destination of a flight on the airline that is purchased. In such a case, the entitlement accrual engine determines how many miles are flown between the origin and the destination to determine how many frequent flyer miles are accrued. Such calculations may be based on information accessible from the identified entitlement program.

The entitlement accrual engine then associates the calculated amount of reward credit with the customer (step 320). An account of the customer within the entitlement management computer application is updated to include the accrued reward credit. The accrued reward credit may either be added to a list of accrued reward credit, or the accrued reward credit may be integrated into a cumulative indication of accrued reward credit. For example, 200 frequent flyer miles may have been accrued earlier for an account, and, as a result of the received transaction data, 500 additional frequent flier miles may be accrued for the account. The 500 frequent flyer miles may be added to a list of reward credit accrued for the account such that the list indicates separately that 200 frequent flyer miles and 500 frequent flyer miles have been accrued. Alternatively or additionally, the frequent flyer reward credit may be combined such that an indication that a total of 700 frequent flyer miles have been accrued for the account is stored in the entitlement repository.

If an account for the customer does not exist within the entitlement management computer application, a new account may be created, and the accrued reward credit is associated with the new account. In addition, the transaction data may indicate that certain characteristics of the account, such as a mailing address or telephone number, have changed since a previous time at which reward credit have accrued for the account, and the account information may be updated to reflect the change.

The entitlement accrual engine determines whether the other entitlement programs from the entitlement policy apply to the received transaction data (step 325). If so, then an entitlement program is identified (step 310), a rule from the entitlement program is used to determine an amount of reward credit that is accrued (step 315), and the calculated amount of reward credit is associated with the customer (step 320). In this manner, different types of reward credit are sequentially accrued for the customer from the received transaction data using different entitlement programs that are applicable to the transaction data. If no other entitlement programs apply to the received transaction data (step 325), then the entitlement accrual engine determines whether other transaction data is to be processed (step 330). If so, then the other transaction data is received (step 305), applicable entitlement programs are identified (step 310), amounts of reward credit are calculated (step 315), and the calculated reward credit is associated with the customer (step 320) for the entitlement programs that apply to the received transaction data. Once no other transaction data is to be processed (step 330), the process 300 is complete.

Figure 4:
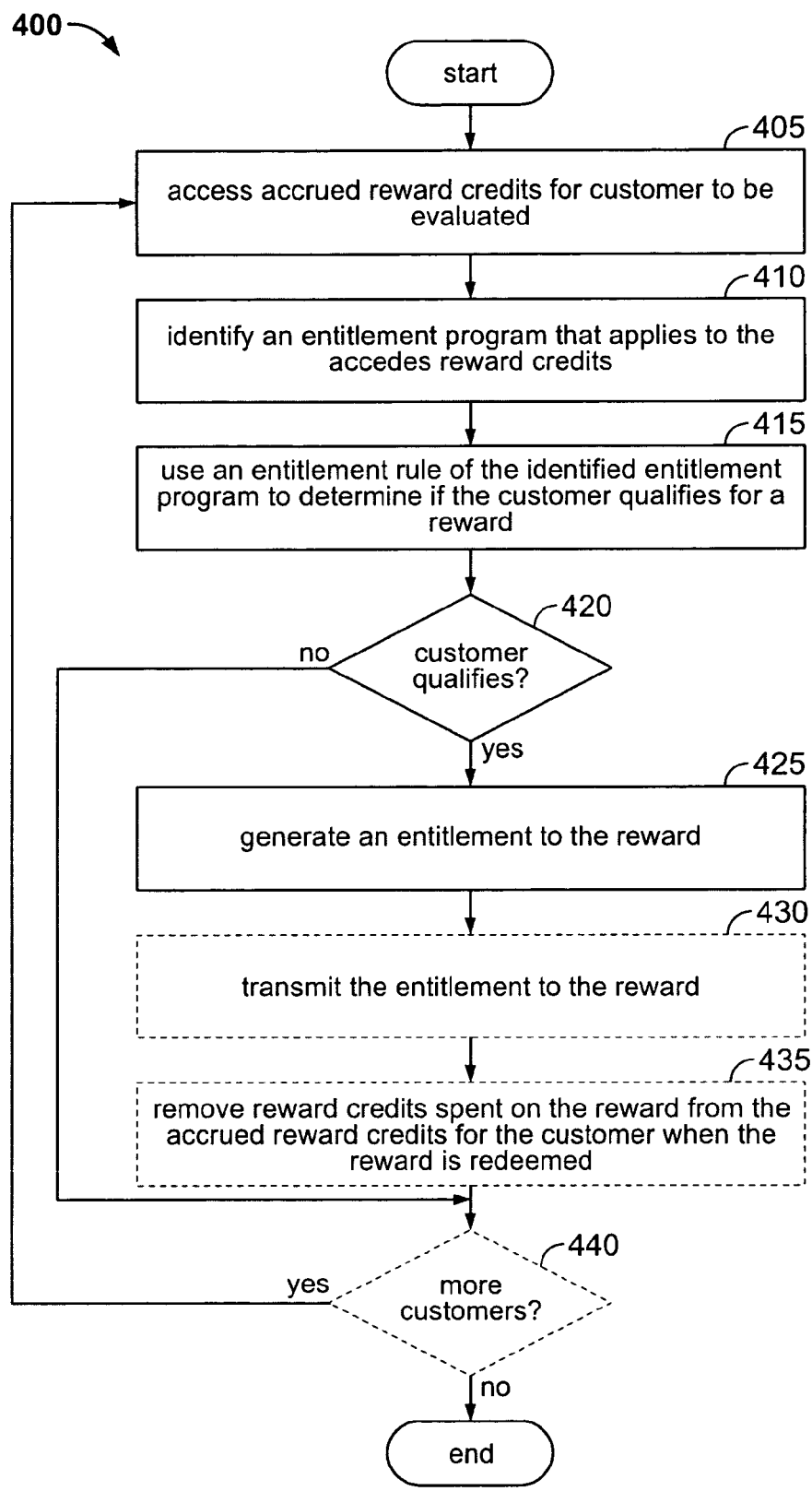
FIG. 4 is a flow chart of a process for generating entitlements to rewards.

FIG. 4 illustrates a process 400 for generating entitlements to rewards for a customer based on reward credit that has accrued for the customer. The process 400 is used to identify whether one or more accounts of customers for whom entitlements are managed qualify for rewards as a result of having accrued a sufficient amount of reward credit. The process 400 is executed by an entitlement management computer application, such as the entitlement management computer application 105 of FIGS. 1A and 105B of FIG. 1B. More particularly, the process 400 is executed by an entitlement redemption engine, such as the entitlement redemption engine 150 of FIGS. 1A and 1B, in conjunction with entitlement information, such as the entitlement repository 120 of FIGS. 1A and 1B, and an entitlement policy 160 of FIG. 1B. The process 400 may be executed on a periodic or aperiodic basis. The process 400 may be executed each time an accrued reward credit is stored in the entitlement repository or after multiple accrued reward credit are stored in the entitlement repository.

The process 400 begins when the entitlement redemption engine accesses accrued reward credit for a customer account to be evaluated from the entitlement repository (step 405). The reward credit may be stored in the entitlement repository as a result of the process 300 of FIG. 3. When the process 400 is executed each time an accrued reward credit is stored in the repository, the account for which the accrued reward credit is stored may be the account for which accrued reward credit are accessed. In general, the account for which accrued reward credit are accessed may be one of the accounts for which accrued reward credit has been stored in the entitlement repository since a previous execution of the process 400. Accessing accrued reward credit for an account may include accessing a list of individual accrued reward credits or accessing a cumulative indication of accrued reward credit.

The entitlement redemption engine identifies an entitlement program that applies to the accessed reward credit (step 410). The identified entitlement program indicates how the reward credit managed by the entitlement management computer application may be redeemed for rewards. The accrued reward credit may correspond to only a subset of the different entitlement programs used by the entitlement management computer application. Therefore, only the appropriate entitlement programs that relate to the accrued reward credit are accessed.

In order to determine which entitlement programs to access, the entitlement redemption engine may access a table that identifies one or more applicable entitlement programs, based on the accessed reward credit. Alternatively or additionally, the accessed reward credit may include an indication of the entitlement programs applicable to the accessed reward credit. In another implementation, when the process 400 is initiated, only the applicable entitlement programs may be made available to the entitlement redemption engine, so the entitlement redemption engine simply accesses entitlement programs that are available.

The entitlement redemption engine uses a rule from the identified entitlement program to determine if the customer qualifies for a reward (step 415). Rules from the identified entitlement program indicate amounts of reward credit that are necessary to receive corresponding rewards. The entitlement redemption engine compares the amounts of accrued reward credit to the amounts indicated in the entitlement program to determine whether the customer qualifies for any rewards. Prior to performing the comparison, the entitlement redemption engine may need to process the accrued reward credit to determine a total amount accrued for each type of reward credit. For example, when the accrued reward credits are stored as a list, the entitlement redemption engine may identify entries in the list that correspond to a particular type of reward credit and sum the corresponding amounts to determine the total amount of the particular type of reward credit that has been accrued. When the accrued reward credits are stored as a cumulative indication of the reward credit, such summation may not be necessary.

Based on the comparison, the entitlement redemption engine determines if the customer qualifies for a reward (step 420). If so, then the entitlement redemption engine generates an entitlement to the reward (step 425). The entitlement to the reward describes the reward to which the customer is entitled after having accrued a sufficient amount of reward credit and the manner in which the reward may be redeemed. The entitlement to the reward may be transmitted from the entitlement management computer application (step 430). The information may be transmitted to a redemption system from which the reward may be redeemed. Alternatively or additionally, the information may be transmitted to the customer. Alternatively, the entitlement to the reward may be stored on the entitlement management computer application for later transfer from the entitlement management computer application.

The account of the customer that qualified for the reward may be updated to indicate that the reward has been redeemed (step 435). When the reward is redeemed, the reward credit used to qualify the account for the reward is removed from the account. In other words, the reward credit is spent on the reward. In some cases, even though the account qualifies for the reward, the reward may not be redeemed by the customer. For example, the customer may not want to redeem a reward because the customer may want to use the associated reward credit to help in qualifying for a reward that requires a larger amount of reward credit. Therefore, the account only may be updated to indicate that the reward credit have been spent on the reward only after the reward has been redeemed.

After the account has been updated (step 435), or if the account does not qualify for a reward (step 420), a determination is made as to whether more customers are to be evaluated (step 440). If so, then accrued reward credit for another customer to be evaluated is accessed (step 405), applicable entitlement programs are accessed (step 410), and a reward may be redeemed if the account qualifies for the reward (steps 415-435). In this manner, customers are sequentially evaluated to determine whether the customers qualify for rewards and to generate information enabling the customers to redeem the rewards.

Figure 5A:
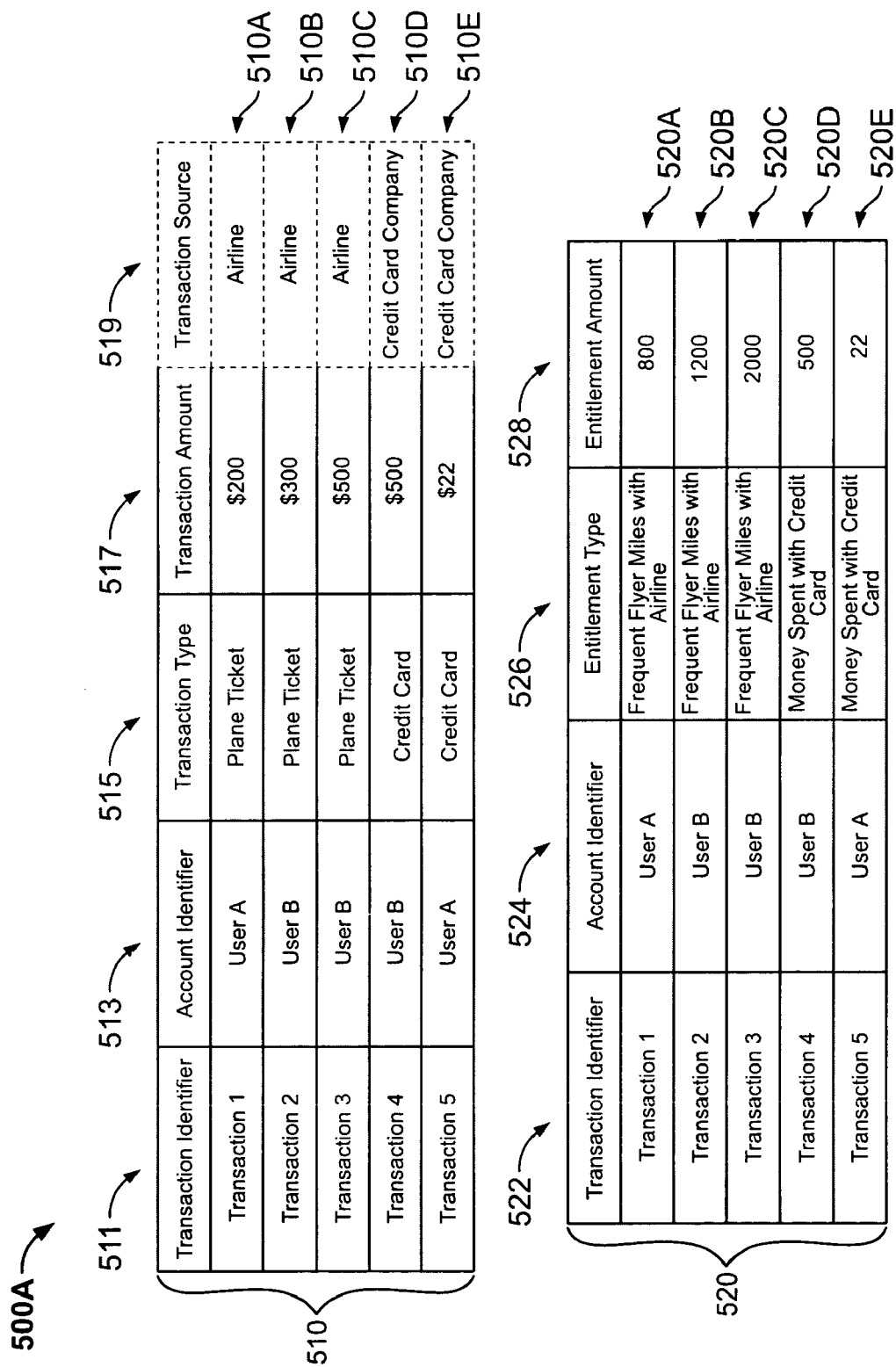
FIGS. 5A and 5B are block diagrams of representations of example entitlement data and redemption information.
Figure 5B:
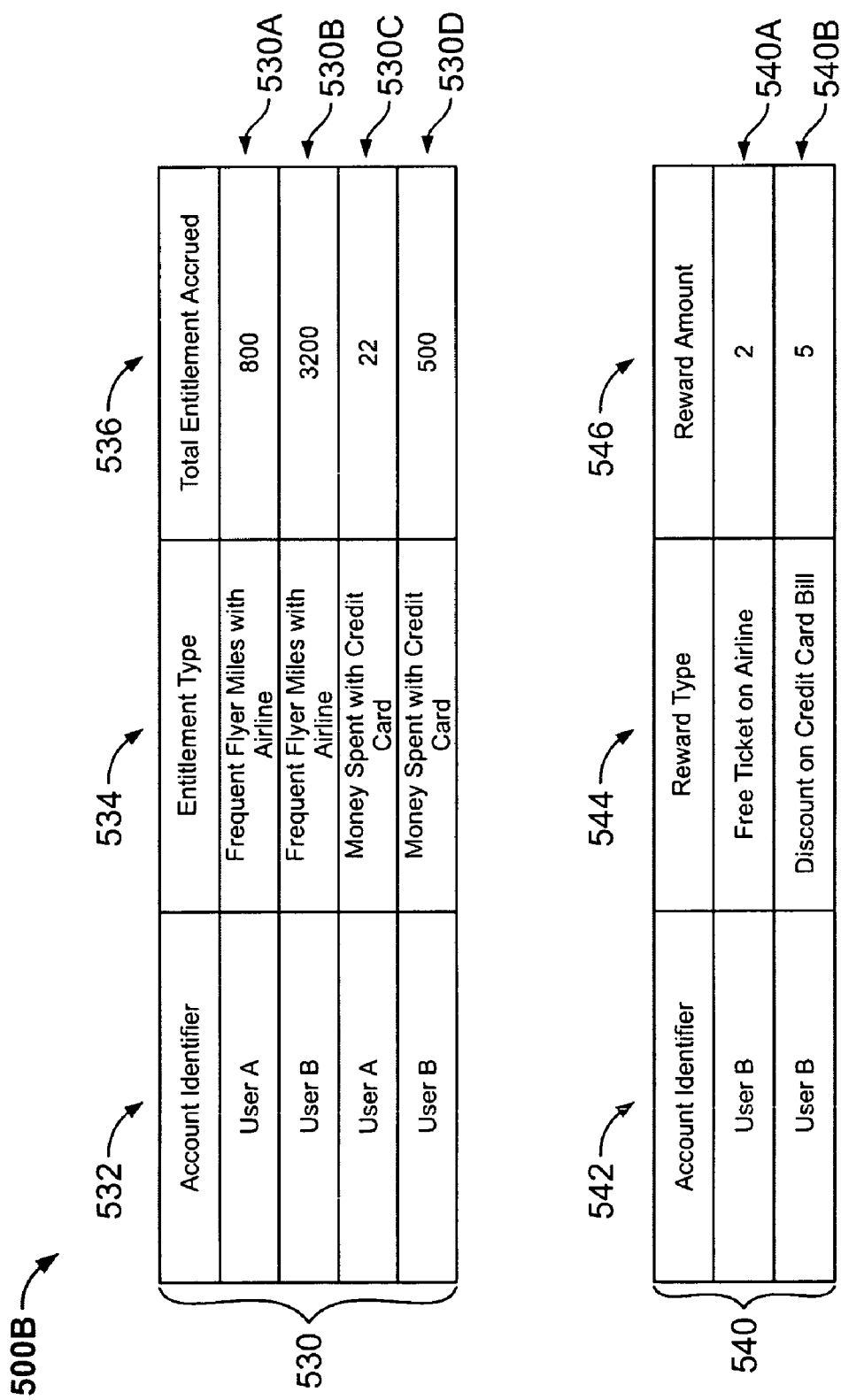

FIG. 5A represents a sample 500A of entitlement information that is accrued from a multiple of transactions, and FIG. 5B represents a sample 500B of entitlement information that has been processed. The entitlement information represented by the sample 500B indicates the awards received as a result of the transactions represented by the sample 500A.

Referring to FIG. 5A, the sample 500A is stored in a relational database system that logically organizes data into database tables. The database tables arrange data associated with an entity (here, transactions and reward credit) in a table or tables. The sample 500A shows a portion of a transaction table 510 and a portion of an entitlement table 520.

The transaction table 510 arranges data associated with a transaction into a series of columns 511, 513, 515, and 517 and rows 510A-510E. Each of the columns 511, 513, 515, and 517 describes an attribute of a transaction for which data is being stored. Each row 510A-510E represents a collection of attribute values for a particular transaction identifiable by a transaction identifier 511. The attributes include an account identifier 513 of an account of a person involved in the corresponding transaction, a transaction type 515 of the corresponding transaction, a transaction amount 517 or the corresponding transaction, and a transaction source 519 of the corresponding transaction.

The row 530A represents a transaction with an identifier "Transaction 1" in which a person corresponding to the account identifier 513 "User A" purchased a plane ticket worth $200 from "Airline." The row 530B represents a transaction with an identifier "Transaction 2" in which a person corresponding to the account identifier 513 "User B" purchased a plane ticket worth $300 from "Airline." The row 530C represents a transaction with an identifier "Transaction 3" in which a person corresponding to the account identifier 513 "User B" purchased a plane ticket worth $500 from "Airline." The row 530D represents a transaction with an identifier "Transaction 4" in which a person corresponding to the account identifier 513 "User B" used a credit card from "Credit Card Company" to make a $500 purchase. The row 530A represents a transaction with an identifier "Transaction 5" in which a person corresponding to the account identifier 513 "User A" used a credit card from "Credit Card Company" to make a $22 purchase The entitlement table 520 arranges data associated with reward credit accrued from transactions into a series of columns 522, 524, 526, and 528 and rows 520A-520E. Each of the columns 522, 524, 526, and 528 describes an attribute of a reward credit for which data is being stored. Each of the rows 520A-520E represents a collection of attribute values for a particular reward credit identifiable by a transaction identifier 522. The attributes include an account identifier 524 of an account of a person to which the corresponding reward credit applies, an entitlement type 526 of the corresponding reward credit, and an amount 528 of the corresponding reward credit.

"Airline" may have an entitlement program in which four frequent flier miles are given to people for each dollar spent purchasing a ticket. Therefore, as indicated in the row 520A, "User A" may receive 800 frequent flyer miles as a result of the transaction in row 510A. Similarly, "User B" may receive 1200 frequent flyer miles as a result of the transaction in row 510B and 2000 frequent flyer miles as a result of the transaction in row 510C, as indicated in rows 520B and 520C.

In addition, "Credit Card Company" may have an entitlement program in which discounts on subsequent credit card bills are given based on an amount of purchases made with the credit card. Therefore, credit is given for the amount of purchases made with the credit card. As indicated in the row 520D, "User B" is given credit for spending $500 with the credit card as a result of the transaction in row 510D. As indicated in the row 520E, "User C" is given credit for spending $22 with the credit card as a result of the transaction in row 510E.

Referring to FIG. 5B, the sample 500B is stored in a relational database system that logically organizes data into database tables. The database tables arrange data associated with an entity (here, reward credit and redemptions of reward credit) in a table or tables. The sample 500B shows a portion of an aggregated entitlement table 530 and a redemption table 540.

The aggregated entitlement table 530 arranges data associated with a transaction into a series of columns 532, 534, and 536 and rows 530A-530D. Each of the columns 532, 534, and 536 describes an attribute of an entitlement for which data is being stored. Each of the rows 530A-530D represents a collection of attribute values for a particular account identifiable by an account identifier 532. The attributes include an entitlement type 534 that indicates the type of reward credit that has been accrued for the particular account and a total amount 536 of the reward credit that has accrued.

The information stored in the aggregated entitlement table 530 is a consolidated version of the information in the entitlement table 520 of FIG. 5A. Rows in the entitlement table 520 with matching account identifiers 524 and entitlement types 526 are combined such that the rows 530A-530D represent total amounts of reward credit that have been accrued. For example, as indicated in row 530A, "User A" has accrued 800 frequent flyer miles. "User B" has accrued a total of 3200 frequent flyer miles, as indicated in row 530B, which represents a consolidation of the information from rows 520B and 520C. As indicated in row 530C, "User A" has spent a total of $22 with the credit card. "User B" has spent a total of $500 with the credit card, as indicated by the row 530D.

The redemption table 540 arranges data associated with a transaction into a series of columns 542, 544, and 546 and rows 540A and 540B. Each of the columns 542, 544, and 546 describes an attribute of an entitlement to a reward for which data is being stored. Each of the rows 540A and 540B represents a collection of attribute values for a particular entitlement to a reward. The attributes include an account identifier 542 of a particular account that is entitled to a reward, a reward type 544 that indicates the type of the reward to which the particular account is entitled, and a reward amount 546 that indicates the amount of the reward that may be redeemed for the particular account.

For every 1500 frequent flyer miles accrued, "Airline" may offer a free airplane ticket. Row 530B indicates that "User B" has accrued enough frequent flyer miles for two such tickets, so "User B" is provided with two free airplane tickets, as indicated in the row 540A. Similarly, "Credit Card Company" may offer a discount of 1% of the total amount purchased with the credit card if the total amount purchased is at least $500. Row 530D indicates that "User B" has purchased at $500 with the credit card, so "User B" is also provided with a $5 discount on a subsequent credit card bill.

Customers are used throughout as an example of reward recipients for which reward credit may be accrued based on transactions with a business enterprise and to which entitlements to rewards are provided when a sufficient amount of reward credit have accrued. However, reward credit may be accrued for other types of entities, such as business partners, vendors, suppliers, and employees.

A business enterprise is used throughout as an example of an entity that maintains an entitlement management computer application to manage entitlements of customers of the business enterprise. However, a single entitlement management computer application may be used to manage entitlements of customers of multiple business enterprises. For example, multiple business enterprises that are business partners may offer similar or partnering entitlement programs that are managed by a single entitlement management computer application. For example, an airline and a car rental company may be business partners that use a common entitlement management computer application. Frequent flyer miles may accrue for a customer within the common entitlement management computer application with every transaction with either the airline or the car rental company, and the accrued frequent flyer miles may lead to entitlements to rewards from either the airline or the car rental company. In such a case, frequent flyer miles accrued as a result of transactions with the airline may be redeemed for rewards from the car rental company, and vice versa.

An entitlement management computer application that manages customer entitlements for a business enterprise may be operated directly by the business enterprise. Alternatively or additionally, the entitlement management computer application may be operated by a third party other than the business enterprise providing the rewards or offering the entitlement programs. For example, the entitlement management computer application may be operated by a business partner of the business enterprise that offers similar or related entitlement programs. As another example, the entitlement management computer application may be operated by an entity that provides an entitlement program management service to one or more unrelated business enterprises. As would be understood by one skilled in the art, additional interfaces to the entitlement management computer application may be required in such a context.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer program product tangibly embodied in a computer-readable medium, the computer program product including instructions that, when executed, cause an entitlement management component to perform operations comprising:

receiving transaction data associated with a reward entity wherein:

the transaction data is generated by a computer application that is separate from the entitlement management component, the transaction data comprises indication of a type from among multiple types of transactions, and a transaction source identifying an entity offering an entitlement program, and the reward entity is a person or an organizational entity that has multiple accounts of reward credit and is eligible to receive rewards for each of the multiple accounts;

in response to receiving the transaction data:

identifying, using at least one computer system, a first portion of the received transaction data related to reward credit accrued as a result of the transaction corresponding to the received transaction data, the first portion of the received transaction data including the indication of the type of transaction and the transaction source, identifying, using the at least one computer system, a second portion of the received transaction data unrelated to reward credit accrued as a result of the transaction corresponding to the received transaction data, and filtering, from the received transaction data and using the at least one computer system, the second portion of the received transaction data unrelated to reward credit accrued as a result of the transaction corresponding to the received transaction data;

subsequent to the filtering of the second portion of the received transaction data, processing, using the at least one computer system, the first portion of the received transaction data to identify the type of transaction and the transaction source;

based on the identified type of transaction and the identified transaction source, identifying, using the at least one computer system, a subset from multiple entitlement programs, wherein each entitlement program of the subset 1) being applicable to the received transaction data, 2) is associated with a type of reward, and 3) has an entitlement rule for determining, from transaction data, an amount of reward credit for the type of reward of the entitlement program;

using an entitlement rule of one of the identified subset of entitlement program to determine an amount of reward credit to be provided to the reward entity associated with the received transaction data;

associating the determined amount of reward credit with the reward entity associated with the received transaction data; and conditioned upon a determination that a total amount of reward credit provided to the reward recipient entitles the reward recipient to a reward associated with the entitlement program, enabling provision of an entitlement to the reward associated with the entitlement program to the reward recipient.

2. The computer program product of claim 1 wherein the identified entitlement program comprises a first entitlement program and the instructions that, when executed, further cause the entitlement management component to:

identify a second entitlement program of the multiple entitlement programs that applies to the received transaction data;

use an entitlement rule of the second entitlement program to determine a second amount of reward credit to be provided to the reward recipient associated with the received transaction data; and associate the second determined amount of reward credit with the reward recipient associated with the received transaction data.

3. The computer program product of claim 2 wherein:

some of the transaction data is sent from a first computing application and applies to the first entitlement program, and another portion of the transaction data is sent from a second computing application and applies to the second entitlement program.

4. The computer program product of claim 1 wherein the instructions that, when executed, further cause the entitlement management component to transfer the indication of the entitlement to the reward to a redemption computer application that 1) is separate from the entitlement management component and 2) is capable of enabling the provision of the reward recipient with the reward.

5. The computer program product of claim 1 wherein the reward entity is a person who has an account of reward credit and is eligible to receive rewards.

6. The computer program product of claim 1 wherein the reward entity is a business entity that has an account of reward credit and is eligible to receive rewards.

7. A computer-implemented method for managing entitlements to rewards from multiple entitlement programs, the method comprising:

receiving transaction data associated with a reward entity wherein:

the transaction data is generated by a computer application that is separate from the entitlement management component, the transaction data comprises indication of a type from among multiple types of transactions, and a transaction source identifying an entity offering an entitlement program, and the reward entity is a person or an organizational entity that has multiple accounts of reward credit and is eligible to receive rewards for each of the multiple accounts;

in response to receiving the transaction data:

identifying, using at least one computer system, a first portion of the received transaction data related to reward credit accrued as a result of the transaction corresponding to the received transaction data, the first portion of the received transaction data including the indication of the type of transaction and the transaction source, identifying, using the at least one computer system, a second portion of the received transaction data unrelated to reward credit accrued as a result of the transaction corresponding to the received transaction data, and filtering, from the received transaction data and using the at least one computer system, the second portion of the received transaction data unrelated to reward credit accrued as a result of the transaction corresponding to the received transaction data;

subsequent to the filtering of the second portion of the received transaction data, processing, using the at least one computer system, the first portion of the received transaction data to identify the type of transaction and the transaction source;

based on the identified type of transaction and the identified transaction source, identifying, using the at least one computer system, a subset from multiple entitlement programs, wherein each entitlement program of the subset 1) being applicable to the received transaction data, 2) is associated with a type of reward, and 3) has an entitlement rule for determining, from transaction data, an amount of reward credit for the type of reward of the entitlement program;

using an entitlement rule of one of the identified subset of entitlement program to determine an amount of reward credit to be provided to the reward entity associated with the received transaction data;

associating the determined amount of reward credit with the reward entity associated with the received transaction data; and conditioned upon a determination that a total amount of reward credit provided to the reward recipient entitles the reward recipient to a reward associated with the entitlement program, enabling provision of an entitlement to the reward associated with the entitlement program to the reward recipient.

8. The method of claim 7 further comprising:

identifying a second entitlement program of the multiple entitlement programs that applies to the received transaction data;

using an entitlement rule of the second entitlement program to determine a second amount of reward credit to be provided to the reward recipient associated with the received transaction data; and associating the second determined amount of reward credit with the reward recipient associated with the received transaction data.

9. The method of claim 8 wherein:

some of the transaction data is sent from a first computing application and applies to the first entitlement program, and another portion of the transaction data is sent from a second computing application and applies to the second entitlement program.

10. A computer program product tangibly embodied in a computer-readable medium, the computer program product including instructions that, when executed, cause an entitlement management component to perform operations comprising:

receiving transaction data associated with a reward entity wherein:

the transaction data comprises data that describes at least one interaction between a business enterprise and the reward entity in which something of value is exchanged, an indication of a type from among multiple types of transactions, and a transaction source identifying an entity offering an entitlement program, and the reward entity is a person or a business entity that has multiple accounts of reward credit and is eligible to receive rewards for each of the multiple accounts;

in response to receiving the transaction data:

identifying, using at least one computer system, a first portion of the received transaction data related to reward credit accrued as a result of the transaction corresponding to the received transaction data, the first portion of the received transaction data including the indication of the type of transaction and the transaction source, identifying, using the at least one computer system, a second portion of the received transaction data unrelated to reward credit accrued as a result of the transaction corresponding to the received transaction data, and filtering, from the received transaction data and using the at least one computer system, the second portion of the received transaction data unrelated to reward credit accrued as a result of the transaction corresponding to the received transaction data;

subsequent to the filtering of the second portion of the received transaction data, processing, using the at least one computer system, the first portion of the received transaction data to identify the type of transaction and the transaction source;

accessing, from electronic storage, computer-accessible entitlement program data for multiple entitlement programs wherein an entitlement program 1) is associated with a type of reward, 2) is associated with an entity offering the entitlement program, and 3) is associated with one or more entitlement rules for determining, from transaction data, an amount of reward credit for the type of reward of the entitlement program;

based on the identified type of transaction and the identified transaction source, identifying, using the at least one computer system, from the accessed entitlement program data a subset of entitlement programs applicable to reward credit relevant to the received transaction data;

for each and only each entitlement program in the subset of identified entitlement programs, accessing, from electronic storage, computer-accessible entitlement rules only for entitlement programs in the subset of entitlement programs, using at least one accessed entitlement rule of the entitlement program to determine an amount of reward credit to be provided to the reward entity associated with the received transaction data, and associating the determined amount of reward credit with the reward entity associated with the received transaction data; and conditioned upon a determination that a total amount of reward credit provided to the reward recipient entitles the reward recipient to a reward associated with an entitlement program, enabling provision of an entitlement to the reward associated with the entitlement program to the reward recipient.

11. The computer program product of claim 10 wherein at least one entitlement program of the subset of entitlement programs determines an amount of reward credit to be provided to the reward entity by determining an amount of reward credit equal to a percentage of the value of a transaction wherein the percentage is less than the value of the transaction.

12. The computer program product of claim 10 wherein:

the received transaction data includes data relating to multiple transactions wherein a transaction describes an interaction between a business enterprise and the reward entity in which something of value is exchanged;

eliminating at least one transaction from the received transaction data to generate filtered transaction data before identifying a subset from the accessed entitlement program data; and identifying a subset from the accessed entitlement program data comprises identifying the subset using the filtered transaction data.

13. The computer program product of claim 1 wherein:

identifying the second portion of the received transaction data unrelated to reward credit accrued as a result of the transaction corresponding to the received transaction data comprises identifying, from the received transaction data, location data describing a location of the transaction corresponding to the received transaction data; and filtering, from the received transaction data, the second portion of the received transaction data unrelated to reward credit accrued as a result of the transaction corresponding to the received transaction data comprises removing, from the transaction data, the location data describing the location of the transaction corresponding to the received transaction data.

14. The computer program product of claim 1 wherein:
identifying the second portion of the received transaction data unrelated to reward credit accrued as a result of the transaction corresponding to the received transaction data comprises identifying, from the received transaction data, time data describing a time of the transaction corresponding to the received transaction data; and filtering, from the received transaction data, the second portion of the received transaction data unrelated to reward credit accrued as a result of the transaction corresponding to the received transaction data comprises removing, from the received transaction data, the time data describing the time of the transaction corresponding to the received transaction data.

15. The computer program product of claim 1 wherein the instructions that, when executed, further cause the entitlement management component to perform operations comprising:

performing an analytical process across the multiple entitlement programs to determine business metrics that collectively apply to the multiple entitlement programs;

generating an entitlement report based on the business metrics that collectively apply to the multiple entitlement programs; and outputting the generated entitlement report.

16. The computer program product of claim 15 wherein performing an analytical process across the multiple entitlement programs to determine business metrics that collectively apply to the multiple entitlement programs comprises performing an analytical process across the multiple entitlement programs to determine a total cost of rewards collectively offered through the multiple entitlement programs, data identifying customers that are not accruing reward credit for the multiple entitlement programs, and a collective cost of operating the multiple entitlement programs.

17. The computer program product of claim 1 wherein using the entitlement rule of one of the identified subset of entitlement program to determine an amount of reward credit to be provided to the reward entity associated with the received transaction data comprises:

accessing, from electronic storage, product data descriptive of a product associated with the transaction corresponding to the received transaction data, the product data including additional data that is not included in the received transaction data; and determining an amount of reward credit to be provided to the reward entity based on the accessed product data.

* * * * *